Aug. 24, 1937.   W. R. ELSEY   2,091,226
REVOLVING SEAT BASE FOR PASSENGER CARS
Filed July 29, 1936    3 Sheets-Sheet 3
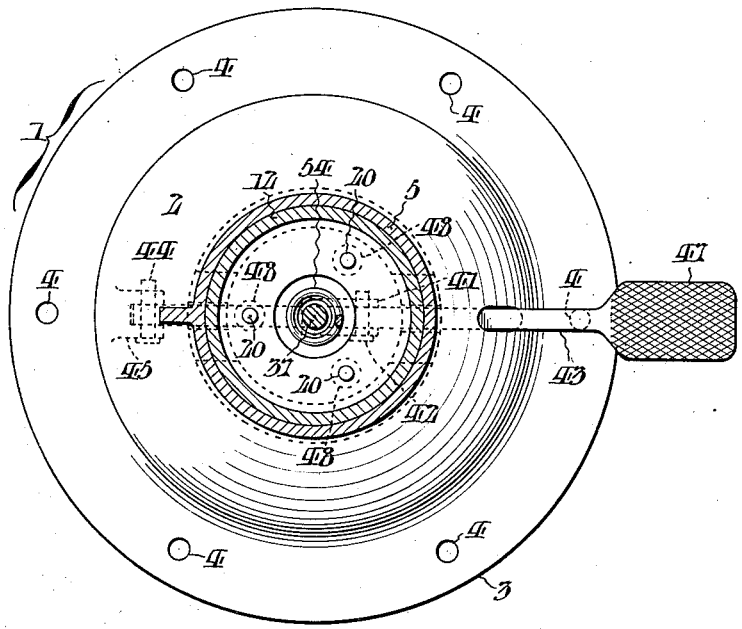
FIG. IV.
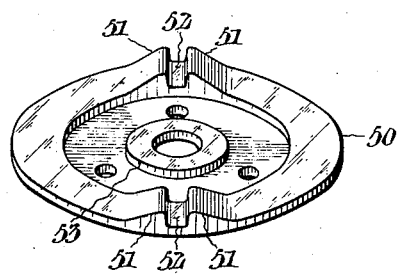
FIG. V.
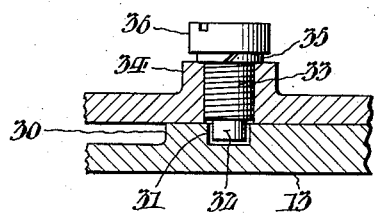
FIG. VI.
WITNESSES:
Woodrow Stevenson
Stanton W. Kerr
INVENTOR:
Warren R. Elsey,
BY Fraley Paul
ATTORNEYS.

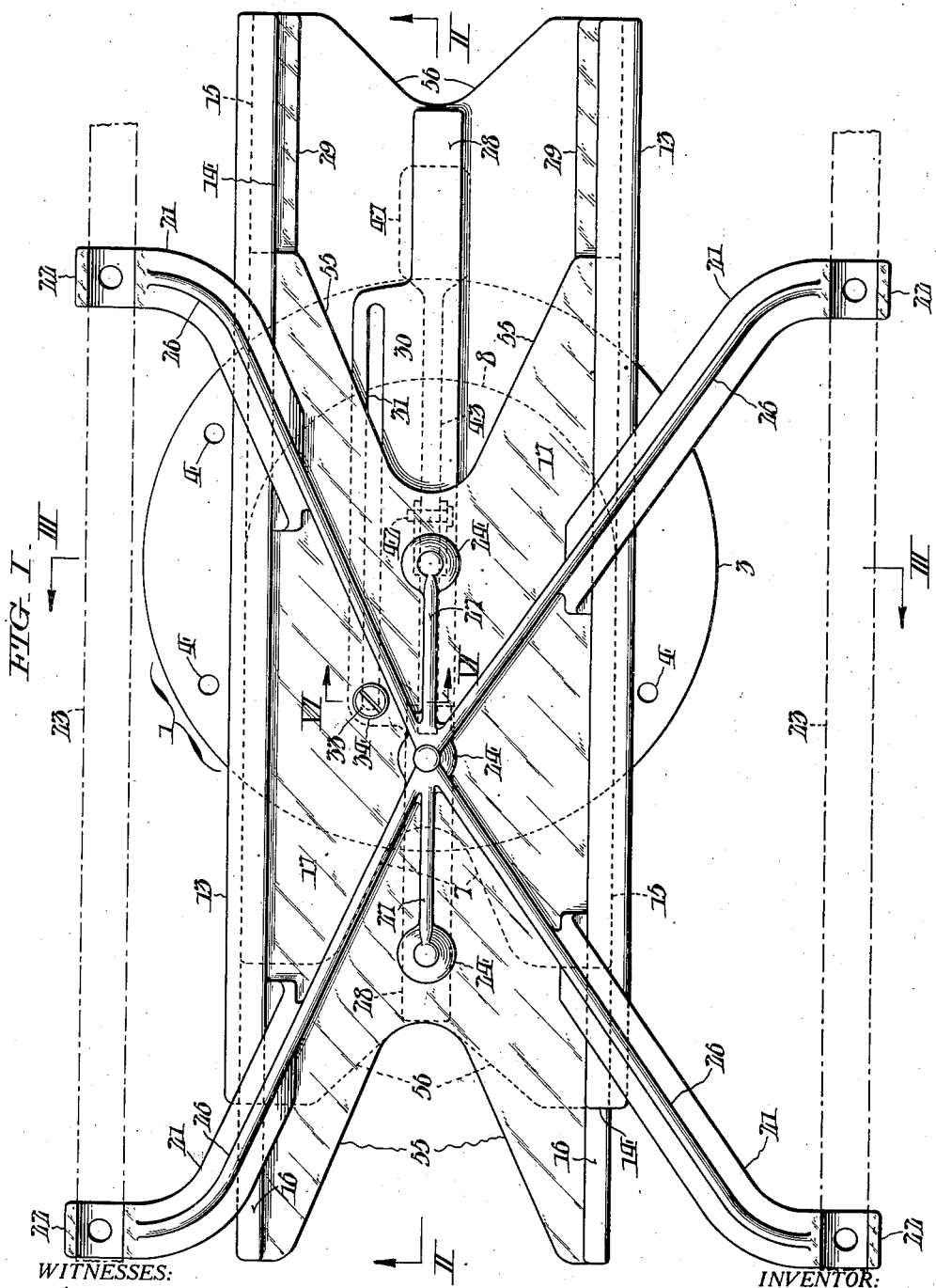

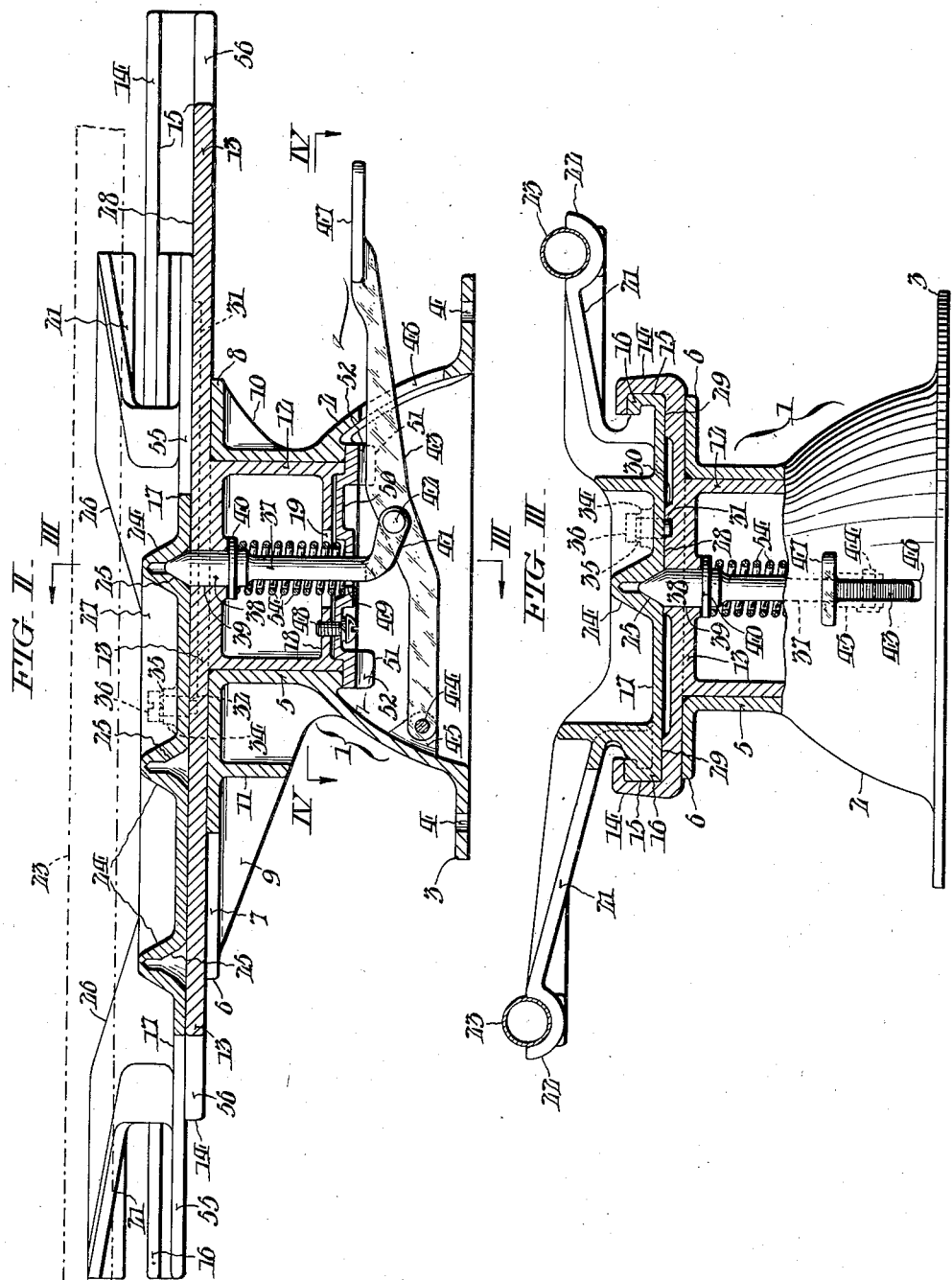

Patented Aug. 24, 1937

2,091,226

UNITED STATES PATENT OFFICE 2,091,226

REVOLVING SEAT BASE FOR PASSENGER CARS

Warren R. Elsey, Elizabeth, N. J., assignor to The Pennsylvania Railroad Company, Philadelphia, Pa., a corporation of Pennsylvania Application July 29, 1936, Serial No. 93,186

12 Claims. (Cl. 155—96)

This invention in its broader aspects has reference to revolving seats including means whereby the seat may be moved laterally or eccentrically displaced for convenience in use or out of use position.

More particularly the present improvements have reference preferably to revolving seats for railroad passenger cars, busses, and similar means of transportation.

An important object of this invention is to provide a novel base or pedestal and revolving means for support of a car seat which accommodates lateral shifting to either hand, while permitting said seat, when in normal position, to be held firmly against a car wall or the like, as well as being movable laterally to provide sufficient clearance for the seat to be turned without interference by said car wall.

Another object is the provision of a novel form of base or pedestal for housing the revolving mechanism as well as a pedal actuable locking means.

Further objects of this invention are to provide a revolving seat base or pedestal for the purpose indicated, which is easy to operate with a minimum of effort; one in which friction and wear are avoided, and in which there is nothing to normally get out of order; one that is easily adapted to different uses; and one which is simple and comparatively inexpensive to construct.

With the foregoing objects in view, this invention may be generally stated as comprising the novel devices, combinations of means and arrangements of parts hereinafter described, illustrated by the accompanying drawings, and more particularly defined in the claims.

In the drawings:

Fig. I is a top plan view of the revolving seat base.

Fig. II is a vertical section, taken as indicated by the arrows II—II in Fig. I.

Fig. III is a similar section, taken on the planes designated III—III in Figs. I and II.

Fig. IV is a horizontal section, taken as indicated by the arrows IV—IV in Fig. II.

Fig. V is an inverted perspective view of a detail, hereinafter explained; and,

Fig. VI is a detail sectional view, on a larger scale, and taken approximately as indicated by the arrows VI—VI in Fig. I.

In all the views, like references are applied to corresponding parts, while the embodiment of the invention shown is illustrative only of a preferred structure of said invention.

According to the showing, the base or pedestal 1 proper embodies a concavo-convex section 2, with a surrounding flange 3, whereby said base can be suitably secured to a car floor or other support, not shown, by appropriate means passed through holes 4 in the flange 3, in an obvious manner. Integral with the concavo-convex section 2 is an upper cylindrical part 5 embodying a supporting flange 6, which, it will be observed extends further to one side of the axis of the pedestal 1 than to the other, for a purpose hereinafter explained, the longer portion is cut out at 7 and the shorter portion rounded at 8 to reduce the weight, while both portions are reinforced by bracket flanges 9, 10, respectively, and the former has an additional cross flange 11, for strengthening purposes, all as readily understood by those acquainted with the art.

Pivotally seating in the pedestal cylindrical part 5 is the revolving mechanism which comprises a hollow tubular section 12 having its upper end closed-in by a guide member 13, with its longitudinal sides upwardly and inwardly flanged at 14 to constitute runners 15 for the conformatively shaped side edges 16 of a crosshead seat support 17. At this juncture it is to be noted the guide member tubular section 12 is substantially closed-in by an inner annular flange 18 providing an axial aperture 19, and having screw-threaded circumferentially-spaced holes 20, Figs. II and IV, for a purpose later on explained.

The crosshead seat support 17 is provided with diagonally-disposed lateral seat sustaining arms 21 having trough-like ends 22 for reception and attachment thereto of conventional seat body members 23; and it is to be remarked said arms are somewhat upwardly directed; while the support 17 is formed with three, for example, upwardly directed aligned conical projections 24 having tapering bores 25, for a purpose later on set forth, and the arms 21 are reinforced by webs 26 merging into the central projection 24; whereas said projections are connected by a rib 27 for strengthening the crosshead 17 longitudinally.

The guide member 13 is provided with a longitudinal offset 28 on its upper face coplanar with side projections 29 that jointly afford a slide bearing for the crosshead 17. In addition the longitudinal offset 28 is laterally expanded at 30 and formed with a movement limiting groove 31, into which the reduced end 32 of a screw stop 33 projects. This screw stop 33 is threadedly engaged through a complementally threaded embossment 34 on the crosshead 17 and has a lock washer 35 intermediate its head 36 and the confronting face of said embossment in order to prevent movement of the screw stop 33 incident to vibration of the revolvable seat base 1 when installed.

For arresting and securing the seat supporting crosshead 17 relative to the guide member 13, as well as locking said parts in the desired position, use is made of a bolt-like member 37 having its upper end 38 adapted for passage through an axial orifice 39 in the guide member 13 and engagement in the respective projection bores 25, as later on amplified. The bolt member 37 is also formed with an abutment shoulder 40 and a bifurcate angled end 41 for operative connection by a pin 42 to the foot lever 43 fulcrumed at one end by means 44 to a suitable fork or spaced projections 45 provided for the purpose within the base concavo-convex section 2; while said lever extends through a vertical slot 46 opposed to the projections 45 and terminates in a pedal portion 47.

Attached to the lower end of the guide tubular section 12 by means of screws 48 engaging in the annular flange holes 29, and with provision for passage therethrough at 49 of the bolt member 37, is a cam plate or disc 50, having diametrically opposed projections or rises 51 with radial notches 52 for coaction with the foot lever 43 aforesaid. As best appreciated from Figs. II and V, the cam plate or disc 50 is cupped at 53 to afford seating for the lower end of a spring 54, the upper end whereof abuts the bolt member shoulder 40 hereinbefore referred to. It is also to be noted the guide member 13 has cut out or forked ends 55 for reduction of the weight without impairing the rigidity while the crosshead 17 has somewhat similar ends 56, for similar structural lightening.

Having outlined the structural aspects of the revolving seat base, the operation of same may be briefly explained as follows. Assuming the parts occupy the positions shown by Figs. I and II more particularly, it is to be observed that the car seat body members 23 with the seat, not shown, as well as the crosshead support 17 are disposed eccentrically to the left-hand of the axis of the base 1; or, in other words, the seat is projected laterally against the car side wall for retention in rigid position. When it is desired to move the seat laterally, either to the extreme right hand, or for pivotal movement, so that the user faces in the desired direction, the pedal 47 is depressed in opposition to the spring 54, with consequent lowering of the bolt member tapered end 38 from engagement in the hollow conical projection 24. Simultaneously the foot lever 43 will be released from the superjacent cam notch 52, whereupon the crosshead 17 can be slid along the guide 13 until the intermediate projection 24 registers over the pivot member end 38 and the seat swung around concentrically of the pedestal 1 as desired, until the pedal 47 is released when the foot lever 43 automatically snaps upwardly into the nearest registering cam notch 52, while the bolt member 37 is similarly engaged. Or, the seat crosshead may be moved to the extreme right hand as limited by the stop reduced end 32 and groove 31, whereupon the bolt member end 38 will snap into the left-hand conical projection bore 25 and the seat be similarly locked by the foot lever 43 and cam notching 52, in an obvious manner.

From the foregoing it will be readily seen that by this invention there is provided a base assembly or pedestal for passenger car seats which is adapted to firmly support and prevent tilting of the seat when normally off-center relative to the rotating mechanism by coaction of the side flanges 14 of the guide 13 with the side edges 16 of the crosshead 17; while such seat can be readily released and moved laterally away from the car side wall into concentric relation with the pedestal 1 for rotation. Furthermore, the locking means 37 described permit the car seat to be either concentric or eccentric to the pedestal 1, and thereby permits said seat being faced in either direction while also providing for its retention in locked position when facing the windows of a car; and finally the seat can be readily rotated without interference from, or contact with, the car wall.

It will thus be seen there is provided by this invention a very simple, compact and efficient arrangement and construction for fulfilling the objects hereinbefore recited; and while there has been illustrated what now seems to constitute the preferred form of the invention, it is to be borne in mind the same is exemplary only, and it is desired to secure and reserve the right to make such changes or modifications as may fairly lie within reasonable interpretation of the following claims and the prior art prescribes.

Having thus described my invention, I claim:

1. In a revolving seat, a hollow pedestal having an upper supporting surface, a guide member embodying a tubular section pivotally mounted in the pedestal, a seat bearing crosshead sustained by the guide member and adapted for longitudinal movement relative thereto, locking means housed in the tubular section and pedestal whereby the crosshead may be arrested eccentric to or concentric with the axis of said pedestal, and means coactive with the locking means for securing the guide member tubular section against rotation concurrently with arrestation of the crosshead in the desired position.

2. In a revolving seat, a hollow pedestal having an upper lateral flange, a guide member seating on said flange and having a tubular section pivotally engaged in the pedestal upper part, a seat supporting crosshead slidably mounted on the guide member with means limiting its movement, pedal actuable locking means substantially housed in the tubular section and pedestal whereby the crosshead may be arrested eccentric to or concentric with the axis of the pedestal, and radially notched cam-like means coactive with the locking means for securing the guide member against rotation concurrent with arrestation of the crosshead in the desired position.

3. In a revolving seat, a hollow pedestal having an upper lateral flange, a guide member seating on said flange and having a tubular section pivotally engaged in the pedestal upper part, a seat supporting crosshead slidably mounted on the guide member with means limiting its movement, pedal actuable locking means substantially housed in the tubular section and pedestal whereby the crosshead may be arrested eccentric to or concentric with the axis of the pedestal, a disc member closing in the lower end of the guide member tubular section and embodying opposed camming risers having radial notches for coaction with the locking means actuator pedal for securing the guide member against rotation concurrent with arrestation of the crosshead in the desired position.

4. In a revolving seat, a hollow pedestal having a base attaching flange and a top supporting-flange, an elongate member seating on said top flange having parallel edge guides with a tubular section pivotally engaged in the pedestal upper part, a seat supporting crosshead mounted on and slidable between the elongate member edge guides, means limiting relative longitudinal movement of the elongate member and the crosshead, a pressure influenced pedal actuated locking element substantially housed in the elongate member tubular section and the pedestal for arresting the crosshead eccentric to or concentric with the pedestal axis, and a disc substantially closing-in the tubular section lower end with radially grooved offsets respectively adapted for engagement by the locking element pedal lever for securing the elongate member against rotation concurrent with arrestation of the crosshead in the desired position, for the purposes specified.

5. A revolving seat structure as claimed in claim 4, wherein the pedestal is in part concavo-convex and in part tubular, said concavo-convex portion having a peripheral attaching flange, and the tubular part embodying an elongate flange offset to one side of its axis to a greater extent than to the other side, the longer projecting portion of said flange being reinforced by longitudinal and cross webs at its underside, and the shorter projecting portion having a longitudinal web only, and said longer projection has its free end forked to reduce its weight with the shorter projection of curved contour.

6. A revolving seat structure as claimed in claim 4, wherein the elongate member has parallel side flanges projecting upwardly and angled inwards to provide guide runners, and its pivotal portion is tubular with an inner annular flange adjacent its lower end.

7. A revolving seat structure as claimed in claim 4, wherein the elongate member tubular section has an inner annular flange providing an axial aperture for passage of the pedal-actuated locking means, and the ends of said member are forked or inwardly cut out for structural lightening thereof.

8. A revolving seat structure as claimed in claim 4, wherein the crosshead embodies diagonally-directed seat-supporting arms and parallel side edges for slidable engagement with the elongate member runners, and a series of hollow projections for coaction with the locking means for the purposes specified.

9. A revolving seat structure as claimed in claim 4, wherein the crosshead embodies diagonally-directed seat supporting arms having troughed free ends, has parallel side edges adapted for sliding engagement between the elongate member guide runners, and a series of aligned hollow coned upward projections for coaction with the locking element upper end to arrest the crosshead eccentric to or concentric with the pedestal axis.

10. A revolving seat structure as claimed in claim 4, wherein the crosshead embodies diagonally-directed seat supporting arms having troughed free ends, has parallel side edges upwardly and inwardly flanged for sliding engagement between the elongate member guide runners, a series of aligned hollow coned upward projections, and the supporting arms are reinforced by longitudinal webs while the conical projections are connected by a strengthening rib.

11. A revolving seat structure as claimed in claim 4, wherein the closing in disc for the pedestal embodies a central recession in its upper face, diametrically opposed camming rises project below the lower surface thereof with intervening radial notches, and said disc is rigidly attached to the elongate member tubular section inner annular flange with its outer peripheral portion underlapping the pedestal cylindrical part lower edge.

12. A revolving seat base for passenger cars comprising a hollow pedestal having a base attaching flange and a top supporting-flange offset with respect to the pedestal axis, an elongate member seating on said top flange having parallel edge guides with a tubular section pivotally engaged in the pedestal upper part, a seat supporting crosshead mounted on and slidable between the elongate member edge guides, means limiting relative longitudinal movement of the elongate member and the crosshead, a pressure influenced pedal actuated locking element substantially housed in the elongate member tubular section and the pedestal for arresting the crosshead eccentric to or concentric with the pedestal axis, and a disc substantially closing-in the tubular section lower end with radially grooved offsets respectively adapted for engagement by the locking element pedal lever for securing the elongate member against rotation concurrent with arrestation of the crosshead in the desired position, for the purposes specified.

WARREN R. ELSEY.